US012697946B2

(12) United States Patent
Marx

(10) Patent No.: US 12,697,946 B2
(45) Date of Patent: Aug. 4, 2026

(54) BRAKE SYSTEM, VEHICLE AND METHOD FOR OPERATING A BRAKE SYSTEM

(71) Applicant: ZF Active Safety GmbH, Koblenz (DE)

(72) Inventor: Andreas Marx, Hartenfels (DE)

(73) Assignee: ZF Active Safety GmbH, Koblenz (DE)

( * ) Notice: Subject to any disclaimer, the term of this patent is extended or adjusted under 35 U.S.C. 154(b) by 610 days.

(21) Appl. No.: 18/176,826

(22) Filed: Mar. 1, 2023

(65) Prior Publication Data

US 2023/0278534 A1     Sep. 7, 2023

(30) Foreign Application Priority Data

Mar. 1, 2022     (DE) .......................... 102022104852.7

(51) Int. Cl.
B60T 13/74          (2006.01)
B60T 7/04           (2006.01)
(52) U.S. Cl.
CPC ......... B60T 7/042 (2013.01); B60T 2270/413 (2013.01); B60T 2270/82 (2013.01); B60Y 2400/81 (2013.01)
(58) Field of Classification Search
CPC ........... B60T 2220/04; B60T 2270/402; B60T 2270/404; B60T 2270/413; B60T 7/042
See application file for complete search history.

(56) References Cited

U.S. PATENT DOCUMENTS

| | | | | |
|---|---|---|---|---|
| 7,620,465 | B2 * | 11/2009 | Degoul | ................... B60T 17/22 700/20 |
| 7,826,952 | B2 * | 11/2010 | Disser | ................... B60T 8/1755 701/72 |
| 8,364,367 | B2 * | 1/2013 | Karnjate | ............... B60T 8/3275 701/70 |
| 11,919,490 | B2 * | 3/2024 | Alford | ................... B60T 8/176 |
| 12,109,991 | B2 * | 10/2024 | Feigel | ................... B60T 13/662 |

(Continued)

FOREIGN PATENT DOCUMENTS

| | | |
|---|---|---|
| DE | 10118263 A1 | 10/2002 |
| DE | 102007040829 A1 | 3/2008 |

(Continued)

*Primary Examiner* — Bradley T King
(74) *Attorney, Agent, or Firm* — Kristin L. Murphy

(57)          ABSTRACT
A brake-by-wire brake system for a vehicle having at least two wheels which can be braked is specified. The brake system comprises at least two brake actuator units, which each have a brake actuator assigned to one of the wheels, which can be braked, for the purposes of braking the vehicle during driving operation. The brake system furthermore comprises a driver brake actuation unit for actuation by the driver for a braking operation, having at least one sensor for detecting an activation of the driver brake actuation unit by the driver, and at least one electronic control unit which is configured to activate one or both brake actuator units in order to impart a braking force to an associated wheel, wherein the driver brake actuation unit is coupled, for transmission of signals, to the at least one electronic control unit. The driver_brake actuation unit has an interface for a controller that is independent of the brake system. A vehicle having a brake system, and a method for operating a brake system, are also specified.

17 Claims, 1 Drawing Sheet

(56)          References Cited

U.S. PATENT DOCUMENTS

| | | | |
|---|---|---|---|
| 12,319,249 B2 * | 6/2025 | Shah | B60T 8/1755 |
| 2008/0197696 A1 * | 8/2008 | Degoul | B60T 7/107 |
| | | | 303/115.4 |
| 2009/0189441 A1 * | 7/2009 | Degoul | B60T 8/885 |
| | | | 303/3 |
| 2010/0241330 A1 * | 9/2010 | Hartmann | B60T 8/344 |
| | | | 701/70 |
| 2018/0244255 A1 * | 8/2018 | Kawai | B60T 13/746 |
| 2020/0238967 A1 * | 7/2020 | Zhang | B60T 17/221 |
| 2020/0406869 A1 * | 12/2020 | Hwang | B60T 17/22 |
| 2021/0031741 A1 * | 2/2021 | Alford | B60T 13/58 |
| 2022/0048479 A1 * | 2/2022 | Kim | B60T 7/042 |
| 2022/0144224 A1 * | 5/2022 | Tarandek | G05G 5/03 |
| 2022/0169222 A1 * | 6/2022 | Ullrich | B60Q 9/00 |
| 2022/0194339 A1 * | 6/2022 | Tarandek | B60T 13/745 |
| 2022/0194344 A1 * | 6/2022 | Tarandek | B60T 13/741 |
| 2023/0192049 A1 * | 6/2023 | Marx | B60T 13/662 |
| | | | 701/70 |
| 2023/0339447 A1 * | 10/2023 | Ha | B60T 13/745 |
| 2024/0286595 A1 * | 8/2024 | Ullrich | B60T 13/686 |
| 2024/0359669 A1 * | 10/2024 | Zhang | B60T 8/17 |
| 2025/0033611 A1 * | 1/2025 | Hwang | B60T 7/12 |
| 2025/0042382 A1 * | 2/2025 | Reuter | B60T 8/172 |
| 2025/0128689 A1 * | 4/2025 | Felch | B60T 17/221 |

FOREIGN PATENT DOCUMENTS

| | | | |
|---|---|---|---|
| DE | 102018133223 A1 | 6/2020 |
| DE | 102020213130 A1 | 4/2021 |
| DE | 102021207910 A1 | 2/2022 |

* cited by examiner

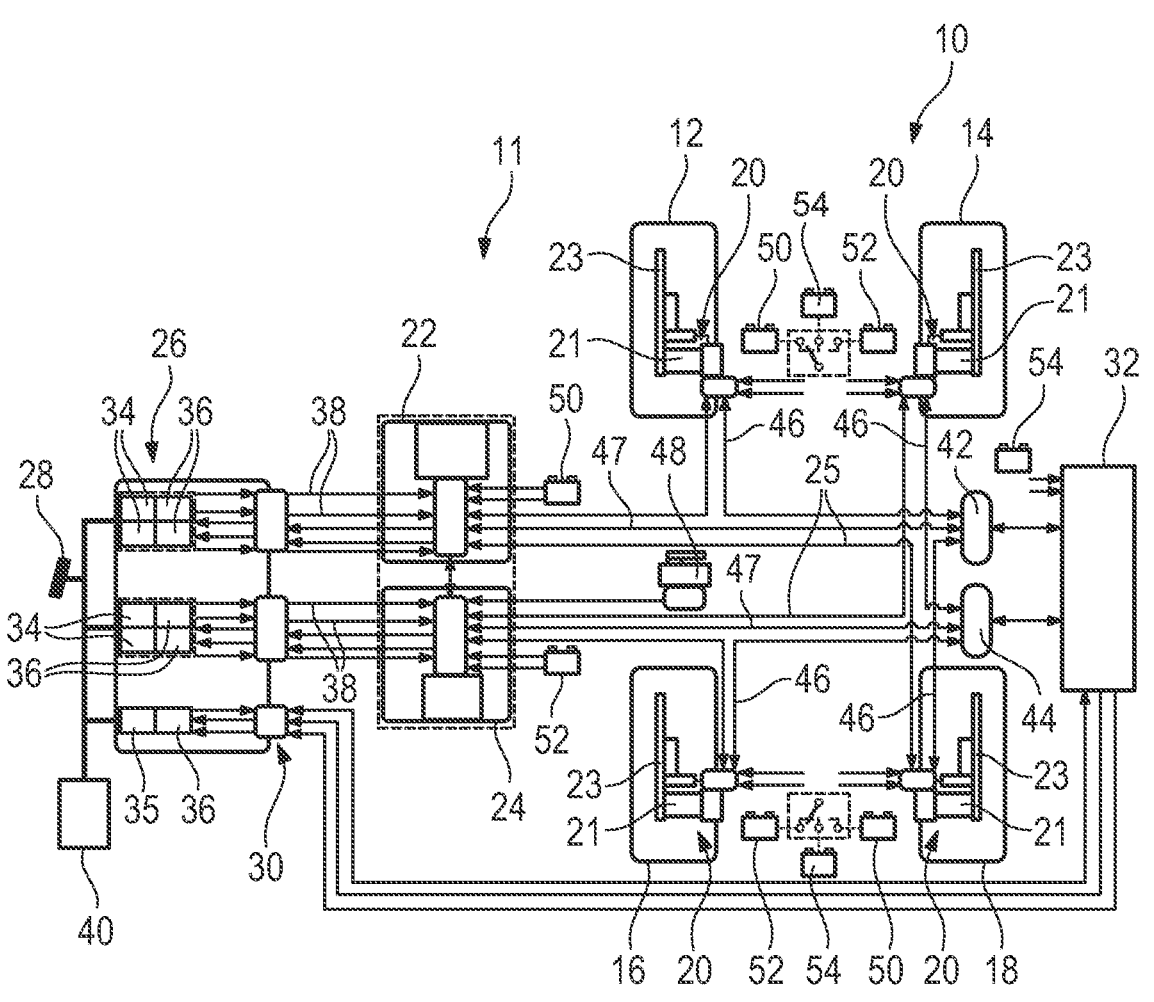

BRAKE SYSTEM, VEHICLE AND METHOD FOR OPERATING A BRAKE SYSTEM

CROSS-REFERENCE TO RELATED APPLICATION

This application claims priority to German Priority Application No. 102022104852.7, filed Mar. 1, 2022, the disclosure of which is incorporated herein by reference in its entirety.

TECHNICAL FIELD

The disclosure relates to a brake-by-wire brake system for a vehicle, to a vehicle having a brake-by-wire brake system, and to a method for operating a brake-by-wire brake system.

BACKGROUND

In modern vehicles, the individual wheels are each assigned a brake actuator unit with an electromechanical brake actuator. Such brake systems are referred to as "brake-by-wire" systems.

In such systems, a brake pedal is used merely to interrogate a braking demand of a driver of the vehicle. On the basis of this braking demand, the individual brake actuator units are then activated by one or more electronic control units. There is no mechanical connection between the brake pedal and the brake actuator units.

Since a brake system is a safety-relevant device of a vehicle, it is common for at least certain components or functions to be implemented redundantly within the brake system, such that the brake system can operate reliably even in the event of a malfunction or a defect. In other words, redundancies are provided within a brake system in order to achieve high operational reliability.

In previous "brake-by-wire" systems, an additional hydraulic brake device has for example been provided as a fall-back level.

This is however associated with high complexity and costs. Furthermore, additional structural space is required, and the weight of the vehicle is increased.

SUMMARY

What is needed, is to provide a brake-by-wire brake system and a vehicle having a brake-by-wire brake system, which brake system is particularly reliable and allows safe onward travel even in the event of a partial failure of the system. It is furthermore sought to specify a method for operating a brake-by-wire brake system, which method allows reliable braking of the vehicle even in the event of a partial failure.

A brake-by-wire brake system for a vehicle having at least two wheels which can be braked is disclosed. The brake system comprises at least two brake actuator units, which each have a brake actuator assigned to one of the wheels, which can be braked, for the purposes of braking the vehicle during driving operation. The brake system furthermore comprises a brake actuation unit for actuation by the driver for a braking operation, having at least one sensor for detecting an activation of the brake actuation unit by the driver, and comprises at least one electronic control unit which is configured to activate one or both brake actuator units in order to impart a braking force to an associated wheel. The brake actuation unit is coupled, for transmission of signals, to the at least one electronic control unit, and the brake actuation unit has an interface for a controller that is independent of the brake system.

This means that, in addition to the existing control unit, a further controller that is present in a vehicle can be connected to the brake system.

An independent controller means a controller which, during normal operation, performs a function other than controlling the brake system, and refers for example to a controller for controlling the steering, drive engine or motor, transmission or chassis system of the vehicle.

The disclosure is based on the concept of utilizing, as an additional fall-back level, a controller that is present in the vehicle in any case. An additional fall-back level can thus be implemented in a particularly inexpensive manner. The controller that is independent of the brake system merely needs to be provided with corresponding programming in order to be able to activate the brake actuators if required.

In one exemplary arrangement, there is no hydraulic or other mechanical connection between the brake actuation unit and the brake actuators for the purposes of transmitting force.

The brake actuation unit is of dry design, that is to say, does not contain any hydraulic fluid.

For example, the brake actuation unit comprises at least two sensors, wherein one sensor is assigned to the control unit such that the control unit can receive an output signal from the sensor. A further sensor is assigned to the interface, such that an output signal from the sensor can be transmitted via the interface. Additional redundancy is provided in this way. Due to the additional sensor assigned to the controller, it is ensured that the controller can function as a fall-back level even if the activation of the brake actuator units by the control unit has been disrupted as a result of failure of the at least one sensor assigned to the control unit.

In one exemplary arrangement, the sensor assigned to the controller is configured to provide, at the interface, those parameters which are also available to the control unit during the normal operation of the brake system. The controller that is independent of the brake system can thus control the brake system without impairment of performance during a braking operation.

The brake system may have at least one further interface for the controller, wherein a communication line runs from at least one brake actuator unit to the further interface. The controller can thus directly activate the brake actuator units via the further interface.

In one exemplary arrangement, the further interface is arranged outside the brake actuation unit.

A vehicle having a brake-by-wire brake system according to the disclosure and having a controller which is independent of the brake system and which is connected via the interface of the brake actuation unit, for transmission of signals, to the brake system and which is configured to activate the brake actuator units_is also disclosed. As already described in conjunction with the brake system, the advantage is thus achieved that an additional fall-back level can be provided in a simple and inexpensive manner.

Via the further interface, the controller can be connected, for transmission of signals, to the brake actuator units in order to directly activate these.

According to one exemplary arrangement, the controller is coupled via a communication line to the at least one control unit of the brake system. In this way, the parameters which are provided at the interface of the brake actuation unit and which are transmitted to the controller can in turn be transmitted from the controller to the control unit. If the malfunction is caused not by the control unit but for example by a sensor failure in the brake actuation unit or a defect in a signal line that leads from the brake actuation unit to the control unit, the control unit can continue to perform the activation of the brake actuator units. In this case, the controller serves merely for signal transfer purposes.

The controller is for example a central controller of the vehicle. The central controller of the vehicle is commonly provided by the vehicle manufacturer itself, and can therefore be programmed accordingly without the need for programming information to be made available to a supplier.

Alternatively, the additional controller may be a zonal controller, that is to say a controller that controls, for example, one functional area of the vehicle. For example, the controller is a controller of the steering system.

In one exemplary arrangement, the brake system comprises at least one energy supply unit which is configured to supply energy to the at least one control unit and/or at least one brake actuator unit, and the vehicle comprises at least one further energy supply unit which is configured to supply energy to the controller. The controller is thus independent of a supply of energy from the brake system.

The energy supply unit of the vehicle may also supply energy to that sensor of the brake actuation unit which is assigned to the interface.

A_method for operating a brake-by-wire brake system according to the disclosure is also disclosed, wherein parameters are detected, and transmitted to the control unit, by the at least one sensor of the brake actuation unit, and the control unit activates the brake actuator units on the basis of the transmitted parameters, and wherein, if an activation of the brake actuator units by the control unit is impaired, those parameters which are available to the control unit during normal operation are provided at the interface for the controller that is independent of the brake system.

The parameters at the interface may be provided by a further sensor that is assigned to the interface.

BRIEF DESCRIPTION OF DRAWINGS

Further advantages and features of the disclosure will emerge from the following description and from the single appended drawing, to which reference is made. Said drawing schematically shows a vehicle according to the disclosure having a brake system according to the disclosure.

DETAILED DESCRIPTION

FIG. 1 illustrates a vehicle 10 having a brake system 11, which has four wheels 12, 14, 16, 18 which can be braked. In one exemplary arrangement, the vehicle has two front wheels 12, 14 and two rear wheels 16, 18.

Each of the wheels 12, 14, 16, 18 is assigned a brake actuator unit 20. In other words, the brake actuator units 20 are arranged at each individual wheel.

The brake actuator units 20 each comprise an electromechanical brake actuator 21 with an electric motor and with a spindle drive. No hydraulic actuator is provided.

The brake actuator 21 serves for the braking of the vehicle during driving operation.

In one exemplary arrangement, the brake system illustrated is a dry brake system 11 without hydraulic fluid.

Due to the brake actuator units 20, a respective brake pad assigned to a wheel 12, 14, 16, 18 can be moved and pressed against a brake disc 23 for the purposes of braking the vehicle. For the sake of simplicity, the brake pads are not illustrated.

The brake system 11 has a first electronic control unit 22 and a second electronic control unit 24 which are each configured to activate two brake actuator units 20 in order to impart a braking force to an associated wheel 12, 14, 16, 18.

As illustrated in FIG. 1, the first control unit 22 and the second control unit 24 respectively activate different brake actuator units 20, which are assigned to diagonally oppositely situated wheels 12, 14, 16, 18.

For this purpose, the control units 22, 24 are in each case connected via communication lines 25, for transmission of signals, to the corresponding brake actuator units 20. Via the communication lines 25, a control signal can be transmitted to the respective brake actuator unit 20.

The two control units 22, 24 are likewise connected to one another for transmission of signals.

In order to be able to generate a brake signal, the brake system 11 comprises a brake actuation unit 26 with a brake pedal 28.

The brake signal is generated by virtue of a driver using their foot to actuate the brake pedal 28 of the brake actuation unit 26 and thus signal their braking demand.

The brake actuation unit has an interface 30 for a controller 32 that is independent of the brake system 11.

The interface 30 is formed for example by a connector plug.

The controller 32 is configured, through corresponding programming, to activate the brake actuator units 20.

For example, the controller 32 is a central controller of the vehicle 10.

In the vehicle 10 which is illustrated, the controller 32 that is independent of the brake system 11 is connected via the interface 30, for transmission of signals, to the brake system 11.

In the exemplary arrangement illustrated, the brake actuation unit 26 comprises multiple sensors 34, 35, for example position transducers.

The sensors 34, 35 can detect an activation of the brake actuation unit 26 by the driver.

Some of the sensors 34 are assigned to the control units 22, 24 such that the control units 22, 24 can receive an output signal from the sensors 34. In the exemplary arrangement, each control unit 22, 24 is assigned in each case two sensors 34.

A further sensor 35 is assigned to the interface 30, such that an output signal from the sensor 34 can be transmitted via the interface 30.

In one exemplary arrangement, the sensors 34 assigned to the control units 22, 24 are of redundant configuration, such that a brake signal can be generated and transmitted even in the event of failure of one sensor 34. For example, in each case two sensors 34 are redundant with respect to one another.

The sensor 35 assigned to the controller 32 that is independent of the brake system 11 is configured to provide, at the interface 30, those parameters which are also available to the control units 22, 24 during the normal operation of the brake system 11.

In the exemplary arrangement, the output signals of the sensors 34 are firstly detected by a signal processing unit 36 before the signals are transmitted to the control units 22, 24 or to the interface 30.

The signal processing unit 36 is likewise of redundant configuration.

Some signal processing units 36, in the exemplary arrangement two signal processing units 36, are electrically connected via communication lines 38, for transmission of signals, to the control units 22, 24.

A further signal processing unit 36 is connected, for transmission of signals, to the interface 30.

The brake actuation unit 26 furthermore comprises a braking force simulator 40. This generates an opposing pressure that counteracts the pressure exerted on the brake pedal 28 by the driver.

The brake system 11 furthermore has two further interfaces 42, 44 for the controller 32.

Via the further interfaces 42, 44, the brake actuators 20 are connected, for transmission of signals, to the controller 32.

In one exemplary arrangement, a communication line 46 runs from each brake actuator unit 20 to one of the two further interfaces 42, 44.

The controller 32 is in turn connected via the vehicle bus to the interfaces 42, 44.

The controller 32 is thus connected via the further interfaces 42, 44, for transmission of signals, to the brake actuator units 20.

The controller 32 is furthermore coupled via communication lines 47 to the control units 22, 24 of the brake system 11.

Specifically, the controller 32 is connected via the interfaces 42, 44, for transmission of signals, to the control units 22, 24, wherein the communication lines 47 run from the interfaces 42, 44 to the control units 22, 24.

In the exemplary arrangement, the vehicle 10 comprises a parking brake, wherein an actuation unit 48 of the parking brake is likewise connected, for transmission of signals, to the control units 22, 24.

Furthermore, the brake system 11 has a first energy supply unit 50 and a second energy supply unit 52.

The first energy supply unit 50 supplies energy to the first control unit 22, and the second energy supply unit 52 supplies energy to the second control unit 24.

Furthermore, the first energy supply unit 50 supplies energy to the brake actuator units 20 of two diagonally oppositely situated wheels 12, 18, more specifically to those brake actuator units 20 which are activated by the first control unit 22. This is illustrated in the FIGURE through the multiple use of the reference designation 50. The first energy supply unit 50 is however in fact provided only singly.

Correspondingly, the second energy supply unit 52 supplies energy to the brake actuator units 20 of two further diagonally oppositely situated wheels 14, 16, more specifically to those brake actuator units 20 which are activated by the second control unit 24.

In other words, the energy supply units 50, 52 are connected in a diagonal configuration.

The first energy supply unit 50 and the second energy supply unit 52 furthermore supply energy to a respective signal processing unit 36.

The vehicle 10 furthermore comprises a further energy supply unit 54, which is configured to supply energy to the controller 32.

The third energy supply unit 54 may additionally supply energy to the brake actuator units 20 in addition to the first and second energy supply units 50, 52.

The third energy supply unit 54 allows an emergency braking operation, in order to safely park the vehicle 10, in the event of failure of the first and the second energy supply unit 50, 52.

During normal, fault-free operation of the brake system 11, both control units 22, 24 activate in each case two brake actuator units 20.

In this state, parameters are detected, and transmitted to the control units 22, 24, by the sensors 34 of the brake actuation unit 26, and the control units 22, 24 activate the brake actuator units 20 on the basis of the transmitted parameters.

If a first control path has failed, for example owing to a failure of one of the two energy supply units 50, 52, one of the two control units 22, 24, two sensors 34, or at least one communication line 25, 38, this is referred to as a partial failure of the brake system 11.

In this case, two diagonally oppositely situated wheels 12, 14, 16, 18 are still activated by way of the second control path. A controlled braking operation is thus still possible. Onward travel can thus be made possible, possibly with limitations such as a limited vehicle speed or a defined remaining travelling distance. For example, a journey can be continued to a destination or to a workshop.

If the second control path also fans after the first control path, or in other words if an activation of all brake actuator units 20 by the control units 22, 24 is impaired, those parameters which are available to the control units 22, 24 during normal operation are provided at the interface 30 for the controller 32 that is independent of the brake system 11.

This is achieved in particular by the additional sensor 35 assigned to the interface 30.

The additional controller 32 can thereupon directly activate the brake actuator units 20.

Alternatively, if the control units 22, 24 are still functional, the controller 32 may transmit the corresponding information via the communication lines 47 to the control units 22, 24, whereupon the brake actuator units 20 are activated by the control units 22, 24 as they are during normal operation.

The control path that runs via the interface 30 and the controller 32 thus forms an additional fall-back level, which allows a particularly high degree of fail-safety of the brake system 11.

The invention claimed is:

1. A brake-by-wire brake system for a vehicle having at least two wheels which can be braked, comprising:
   at least two brake actuator units, each of the two brake actuator units having a brake actuator assigned to one of the wheels, which can be braked, for braking the vehicle during a driving operation,
   a driver brake actuation unit for actuation by a driver for a braking operation, the driver brake actuation unit having at least one sensor for detecting an activation of the driver brake actuation unit by the driver,
   at least one electronic control unit of the brake system which is configured, during normal operation, to activate one or more brake actuator units in order to impart a braking force to an associated wheel,
   wherein the driver brake actuation unit is coupled, for transmission of signals, to the at least one electronic control unit of the brake system, and
   wherein the driver brake actuation unit has an interface for a controller that is independent of the brake system,
   wherein the controller that is independent of the brake system is a vehicle controller that during normal operation, performs a vehicle function other than braking and is not part of the brake system, and is configured to activate the brake actuator units only in a fallback operating mode when activation of the brake actuator units by the at least one electronic control unit of the brake system is impaired.

2. The brake system according to claim 1, wherein the driver brake actuation unit comprises at least two sensors, wherein one sensor is assigned to the control unit such that the control unit can receive an output signal from the sensor, and a further sensor is assigned to the interface such that an output signal from the sensor can be transmitted via the interface.

3. The brake system according to claim 2, wherein the sensor assigned to the controller is configured to provide, at the interface, those parameters which are also available to the control unit during the normal operation of the brake system.

4. The brake system according to claim 1, wherein the brake system has at least one further interface for the controller, wherein a communication line runs from at least one brake actuator unit to the further interface.

5. A vehicle having a brake-by-wire brake system according to claim 1, wherein the vehicle controller is configured to control a non-braking vehicle function during normal operation, and which is connected via the interface of the driver brake actuation unit, for transmission of signals, to the brake system and which is configured to activate the brake actuator units in the fallback operating mode.

6. The vehicle according to claim 5 having a brake system, that has at least one further interface for the vehicle controller, wherein a communication line runs from at least one brake actuator unit to the further interface, wherein the vehicle controller is connected via the further interface, for transmission of signals, to the brake actuator units.

7. The vehicle according to either one of claim 5, wherein the vehicle controller is coupled via a communication line to the at least one control unit of the brake system.

8. The vehicle according to claim 5, wherein the vehicle controller is a central controller of the vehicle.

9. The vehicle according to claim 5, wherein the brake system comprises at least one energy supply unit which is configured to supply energy to the at least one control unit and/or at least one brake actuator unit, and the vehicle comprises at least one further energy supply unit which is configured to supply energy to the vehicle controller.

10. The brake system according to claim 1, wherein the sensor, the control unit and/or the energy supply of the brake actuator units are provided in each case in redundant form.

11. A method for operating a brake-by-wire brake system according to claim 1, wherein parameters are detected, and transmitted to the control unit, by the at least one sensor of the driver brake actuation unit, and the control unit activates the brake actuator units on the basis of the transmitted parameters, and wherein, if an activation of the brake actuator units by the control unit is impaired, those parameters which are available to the control unit during normal operation are provided at the interface for the vehicle controller that is independent of the brake system.

12. The brake system according to claim 2, wherein the brake system has at least one further interface for the vehicle controller, wherein a communication line runs from at least one brake actuator unit to the further interface.

13. The brake system according to claim 3, wherein the brake system has at least one further interface for the vehicle controller, wherein a communication line runs from at least one brake actuator unit to the further interface.

14. The vehicle according to claim 6, wherein the vehicle controller is coupled via a communication line to the at least one control unit of the brake system.

15. The vehicle according to claim 7, wherein the vehicle controller is a central controller of the vehicle.

16. The vehicle according to claim 15, wherein the brake system comprises at least one energy supply unit which is configured to supply energy to the at least one control unit and/or at least one brake actuator unit, and the vehicle comprises at least one further energy supply unit which is configured to supply energy to the controller.

17. The brake system according to claim 13, wherein the sensor, the control unit and/or the energy supply of the brake actuator units are provided in each case in redundant form.

* * * * *